(12) United States Patent
Schweizer

(10) Patent No.: US 10,337,531 B2
(45) Date of Patent: Jul. 2, 2019

(54) DIFFUSION PUMP TO SUPPLY HEAT FROM A CONDENSER TO A HEATING ELEMENT

(71) Applicant: Leybold GmbH, Köln (DE)

(72) Inventor: Hans-Werner Schweizer, Brühl (DE)

(73) Assignee: LEYBOLD GMBH, Köln (DE)

( * ) Notice: Subject to any disclaimer, the term of this patent is extended or adjusted under 35 U.S.C. 154(b) by 217 days.

(21) Appl. No.: 15/320,938

(22) PCT Filed: Jun. 10, 2015

(86) PCT No.: PCT/EP2015/062987
§ 371 (c)(1),
(2) Date: Dec. 21, 2016

(87) PCT Pub. No.: WO2016/000924
PCT Pub. Date: Jan. 7, 2016

(65) Prior Publication Data
US 2017/0130738 A1    May 11, 2017

(30) Foreign Application Priority Data

Jun. 30, 2014 (DE) .................. 10 2014 212 644

(51) Int. Cl.
*F25B 29/00*    (2006.01)
*B01D 8/00*    (2006.01)
(Continued)

(52) U.S. Cl.
CPC .................. *F04F 9/08* (2013.01); *B01D 8/00* (2013.01); *F04D 33/00* (2013.01); *F04F 9/04* (2013.01);
(Continued)

(58) Field of Classification Search
CPC .............. F04B 2205/10; F04B 2205/11; F04B 2207/01; F04F 9/08; F04F 9/00; F04F 9/04; F04F 9/06; B01D 8/00
See application file for complete search history.

(56) References Cited

U.S. PATENT DOCUMENTS

| | | | | |
|---|---|---|---|---|
| 2,438,387 A | * | 3/1948 | Colaiaco | F04F 9/00 122/13.01 |
| 2,630,266 A | * | 3/1953 | Lawrance | F04F 9/00 417/153 |

(Continued)

FOREIGN PATENT DOCUMENTS

| | | |
|---|---|---|
| CH | 429008 A | 1/1967 |
| DE | 1035314 B | 7/1958 |

(Continued)

*Primary Examiner* — Bryan M Lettman
*Assistant Examiner* — Timothy P Solak
(74) *Attorney, Agent, or Firm* — Ohlandt, Greeley, Ruggiero & Perle, LLP

(57) ABSTRACT

A diffusion pump is provided that includes a housing and a boiling chamber connected to the housing. The boiling chamber has a heating element. The housing has a nozzle that is connected to the boiling chamber. The housing also has a condenser is arranged at an internal surface, where the condenser has a cooling system. The boiling chamber is thermally isolated from the condenser by an isolator. The cooling system is at least partially a water cooling system and is connected to the heating element via a heat pump such that heat from the condenser is supplied to the heating element.

15 Claims, 2 Drawing Sheets

(51) Int. Cl.
*F04F 9/04* (2006.01)
*F04F 9/08* (2006.01)
*F04D 33/00* (2006.01)
*F25B 30/00* (2006.01)
*F04F 9/00* (2006.01)

(52) U.S. Cl.
CPC .............. *F25B 29/00* (2013.01); *F25B 30/00* (2013.01); *F04F 9/00* (2013.01)

(56) References Cited

U.S. PATENT DOCUMENTS

| | | |
|---|---|---|
| 2,855,140 A | 10/1958 | Sedlacsik, Jr. |
| 3,237,419 A * | 3/1966 | Venema .................. F04B 37/08 417/53 |
| 3,273,787 A * | 9/1966 | Noller ....................... F04F 9/00 417/153 |
| 4,191,512 A * | 3/1980 | O'Neal, III ............... F04F 9/08 219/499 |
| 4,566,861 A | 1/1986 | Landfors |
| 4,610,603 A | 9/1986 | Norman |
| 5,137,429 A * | 8/1992 | Broadhurst ............... F04F 9/00 417/152 |
| 2011/0021332 A1* | 1/2011 | Akatsu .................... B04B 15/02 494/1 |
| 2013/0276936 A1 | 10/2013 | Schulz |

FOREIGN PATENT DOCUMENTS

| | | |
|---|---|---|
| DE | 9112714 U1 | 1/1992 |
| DE | 102010028441 A1 | 11/2011 |
| GB | 829020 | 2/1960 |
| JP | 2011255250 A | 12/2011 |
| WO | 2011103873 A2 | 9/2011 |

* cited by examiner

DIFFUSION PUMP TO SUPPLY HEAT FROM A CONDENSER TO A HEATING ELEMENT

BACKGROUND

1. Field of the Disclosure

The disclosure relates to a diffusion pump.

2. Discussion of the Background Art

Conventional diffusion pumps comprise a boiling chamber in which a heating element is arranged. With the aid of the heating element a propellant is evaporated. A conventional diffusion pump comprises a housing immediately adjacent to the boiling chamber. In the housing a nozzle is arranged. The propellant vapor rises from the boiling chamber to the nozzle, is deflected by the nozzle to form an umbrella-shaped vapor stream and entrains diffusing gas molecules. Subsequently, the propellant vapor is condensed again by a condenser. The condensed propellant travels back to the boiling chamber. The entrained gas is pumped out by a vacuum pump connected to a forevacuum branch. With the aid of this process, gas is removed from a vacuum chamber such that a vacuum is produced in the vacuum chamber.

The diffusion process applied in a diffusion pump entails a high energy consumption. First, the propellant must be set to a high temperature for boiling and/or evaporating purposes. This is usually effected with the aid of electric heat energy. However, the propellant vapor must be condensed again. For this purpose, the introduced heat must be dissipated again. Dissipated heat is lost energy which is withdrawn from the overall process.

Further, the diffusion process of known diffusion pumps is performed in an unregulated manner, i. e. the heating element heats the propellant to a preset (temperature) value. This preset temperature is then kept constant. Further, the preset temperature need not meet any higher requirements with the exception that it must be ensured that the propellant evaporates and the propellant is not thermally decomposed. Further, the known diffusion pump is cooled in an unregulated manner such that maximum cooling is selected. In the case of an unregulated heating element thermal heat that is not required must be dissipated via increased cooling.

Thus known diffusion pumps are energy-inefficient and are characterized by an unnecessarily high energy consumption.

It is an object of the present disclosure to provide a diffusion pump wherein the energy consumption is reduced.

SUMMARY

The diffusion pump according to the disclosure, in particular an energy-efficient diffusion pump, comprises a housing. The housing has connected thereto a boiling chamber, wherein in the area of the boiling chamber a heating element is arranged. With the aid of the heating element in the boiling chamber a propellant is evaporated. In the housing a nozzle is arranged which is connected to the boiling chamber. The propellant vapor from the boiling chamber thus travels to the nozzle and escapes through the nozzle. At an inner surface of the housing, in the area of the nozzle, a condenser is arranged. Further, a cooling system for cooling the condenser is arranged in the area of the condenser. The propellant vapor escaping from the nozzle travels to the condenser and condenses at the nozzle. The condensed propellant travels again into the boiling chamber of the diffusion pump. In particular, the housing has connected thereto a vacuum chamber which is evacuated by the diffusion pump.

According to the disclosure, the boiling chamber is thermally isolated from the housing and in particular from the condenser by an isolator. The isolator prevents heat generated by the heating element in the boiling chamber from being transferred to the condenser since the temperature in the boiling chamber is considerably higher than the temperature of the condenser. Heat, which would be transferred from the boiling chamber to the condenser if no isolator is provided, would have to be dissipated via the cooling system of the condenser to guarantee a constant temperature of the condenser. Thus greater demand is made on the cooling system of the condenser. At the same time, the dissipated heat results in lost energy since the dissipated heat is no longer available for heating the propellant. Therefore the isolator is in particular characterized by low heat conductivity such that heat cannot be transferred from the boiling chamber to the condenser. Hence both the energy consumption of the heating element and the demand made on the cooling system of the condenser are reduced.

Alternatively or additionally, the cooling system of the condenser of the diffusion pump according to the disclosure is at least partially designed as a water cooling system. Here, the condensation heat occurring at the condenser is dissipated via the water cooling system.

Alternatively or additionally, the cooling system of the condenser of the diffusion pump according to the disclosure is connected to the heating element via a heat pump. Hence the heat produced at the condenser due to condensation of the propellant vapor is conveyed to the heating element such that the conveyed heat can be used for evaporating the propellant. The heat pump allows for the heat energy, which must be withdrawn from the process by the condenser, to be fed to the pumping process by the heating element. Thus the dissipation loss of the process is considerably reduced such that both the energy required for the heating element and the demand made on the cooling system of the condenser can be reduced. In particular when the cooling system of the condenser is a water cooling system the amount of water required for cooling the condenser can be reduced by providing a heat pump.

Alternatively or additionally, the diffusion pump according to the disclosure comprises a temperature measuring device which measures the condenser temperature, wherein the temperature measuring device is connected to a condenser cooling system regulator for regulating the cooling system of the condenser. Hence cooling of the condenser can be individually adjusted to the requirements. Here, a reduction of the temperature of the condenser to the lowest temperature possible is no longer necessary. Due to the regulation of the cooling system of the condenser and the associated adjustment to the required condenser temperature, energy, in particular energy for cooling the condenser, can be further reduced. When the cooling system of the condenser is a water cooling system the required amount of cooling water can be reduced by providing a temperature measuring device and a condenser cooling system regulator connected to the temperature measuring device.

Alternatively or additionally, the diffusion pump according to the disclosure comprises a heating element regulator which is connected to the heating element. The heating element regulator is capable of adjusting the capacity of the heating element to the prevailing pumping situation. Three pumping situations are contemplated. In a first pumping situation no or only a small amount of pumping of the diffusion pump is required. This pumping situation occurs in particular between two pumping processes. A second pumping situation is a pumping-out process, wherein, proceeding from a forevacuum in particular generated by a forevacuum pump, the operating pressure in the vacuum chamber is to be reached. The operating pressure is to be understood as the pressure to be generated in the vacuum chamber by the diffusion pump. The second pumping situation is in particular characterized by a large mass flow. In the third pumping situation the diffusion pump maintains the operating pressure in the vacuum chamber. Further, pumping of the diffusion pump is necessary, but the mass flow is considerably lower than during the pumping-out process. Depending on the prevailing pumping situation the heat output of the heating element is adjusted by the heating element regulator such that an optimum utilization of the heat output is attained and no excessive heat is introduced into the diffusion pump, which heat would, with great effort, have to be dissipated by the cooling system of the condenser.

Individual ones of the aforementioned independent measures or a combination thereof help to realize an energy-efficient diffusion pump with the aid of which the energy consumption can be considerably reduced.

In particular, the diffusion pump is configured for generating a vacuum pressure of $10^{-3}$ mbar, preferably $10^{-6}$ mbar, and most preferably $10^{-9}$ mbar.

In particular, the isolator for thermally isolating the boiling chamber from the condenser comprises PEEK, PTFE, another plastic material or a ceramic material. These materials are in particular characterized by a low heat conductivity, wherein a high thermal stability of these materials is guaranteed.

Preferably, the boiling chamber is in particular completely thermally insulated from the surroundings in the area of the heating element. Thereby the heat loss due to dissipation of the heat from the outer surface of the boiling chamber to the surroundings is reduced. In particular, the heat generated by the heating element is kept inside the boiling chamber such that the heat output and thus the energy required for heating the pumping medium are further reduced.

In particular, the diffusion pump comprises a vapor barrier axially spaced apart from the nozzle, wherein the vapor barrier comprises a vapor barrier cooling system independent of the cooling system of the condenser. The vapor barrier is designed to prevent the propellant from entering the vacuum chamber since beforehand the propellant vapor condenses at the vapor barrier. In particular, the temperature difference between the vapor barrier and the condenser is large and most preferably larger than 20° C. Hence it is ensured that propellant vapor not condensing at the condenser is condensed at the vapor barrier. In particular when the condenser cooling system is variably designed by providing a condenser cooling system regulator, it is preferred that the vapor barrier cooling system is configured such that a constant cooling of the vapor barrier is attained. Since the vapor barrier is a system which is intended to protect apparatus in the vacuum chamber from being damaged by propellant vapor, it must be ensured that the vapor barrier functions properly in any case. This is attained by constant cooling.

In particular, the vapor barrier and the vacuum-side area of the condenser have a temperature of 20° C.-30° C. The high-vacuum area is an area of the condenser facing towards the vacuum chamber. The low temperature of the vapor barrier and the condenser ensures that the propellant reliably condenses. In particular, however, the temperature of the condenser can be changed depending on the required operating pressure or the required pump capacity.

In particular, a forevacuum branch is arranged between the nozzle and the boiling chamber, said branch being adapted to be connected to a forevacuum pump. The forevacuum branch comprises a cooling system. Preferably, the cooling system of the forevacuum branch is independent of the cooling system of the condenser. Cooling of the forevacuum branch prevents the propellant vapor from entering the forevacuum pump.

Preferably, the cooling system of the forevacuum branch and/or the cooling system of the vapor barrier is at least partially a water cooling system.

In particular when the cooling system of the condenser is at least partially a water cooling system, the condenser cooling system regulator comprises a thermostat valve with the aid of which the amount of cooling water can be controlled depending on the measured condenser temperature.

In particular, the condenser cooling system regulator comprises an emergency means, wherein the emergency means ensures minimum cooling of the condenser. Since in the case of failure of the cooling system of the condenser the propellant vapor is no longer condensed, said vapor would uncontrolledly enter the vacuum chamber. To prevent such a situation the emergency means ensures minimum cooling of the condenser. In particular when the condenser cooling system regulator comprises a thermostat valve, minimum cooling is ensured by a bypass bypassing the thermostat valve. The bypass transports just as much cooling water as is required for minimum cooling of the condenser. If the condenser cooling system regulator fails, cooling water continues to flow through the bypass to the condenser for cooling the condenser.

In particular, an evaporator of the heat pump is connected to the cooling system of the condenser, and a condenser of the heat pump is connected to the heating element. Hence heat dissipated from the propellant by the condenser is returned to the heating element. In particular, the heat pump is configured as a compression heat pump or as an absorption heat pump.

In particular, it is preferred that the condenser is cooled both by a water cooling system and by a heat pump. In particular, the high-vacuum-side area of the condenser comprises a water cooling system and the area of the condenser adjacent in the direction of the condenser is connected to the heat pump.

Preferably, the heat pump is of a multistage configuration, whereby a larger temperature difference between the evaporator of the heat pump, which is connected to the cooling system of the condenser, and the condenser of the heat pump, which is connected to the heating element, can be provided.

In particular, the propellant is a silicone oil, a mineral oil or Fomblin®. Preferably, the mineral oil is Diffelen. It is particularly preferred that the propellant used has a small evaporation enthalpy.

In the water cooling system water is preferably used as a cooling fluid. However, the use of another cooling fluid is also contemplated. Here, it may be necessary to circulate the cooling fluid. However, this requires the cooling fluid to be cooled. In this case, the present disclosure does not provide for the the amount of cooling water or cooling fluid but the energy required for cooling the circulated cooling fluid to be reduced. This is equivalent to the reduction of the required amount of cooling water.

The disclosure further relates to a method for controlling a diffusion pump having a housing, a boiling chamber connected to the housing, a heating element arranged in the area of the boiling chamber, a nozzle arranged in the housing and connected to the boiling chamber, a condenser arranged at the inner surface of the housing in the area of the nozzle, and a cooling system for cooling the condenser arranged in the area of the condenser, wherein the condenser temperature is measured and cooling of the condenser is controlled by a condenser cooling system regulator depending on the measured condenser temperature.

The disclosure further relates to a method for controlling a diffusion pump having a housing, a boiling chamber connected to the housing, a heating element arranged in the area of the boiling chamber, a nozzle arranged in the housing and connected to the boiling chamber, a condenser arranged at the inner surface of the housing in the area of the nozzle, and a cooling system for cooling the condenser arranged in the area of the condenser, wherein the heating element temperature of the heating element is adjusted during the pumping process, in particular to the upper value of the boiling range of the propellant used. Hence heat energy is prevented from unnecessarily being introduced into the diffusion pump. Adjustment of the temperature of the heating element in particular to the upper value of the boiling range of the propellant used ensures that the propellant, in particular its low-boiling portions and its high-boiling portions, can be caused to evaporate. A higher heating element temperature is not required such that no further energy need be applied. In particular, it is thus ensured that the propellant used is not thermally decomposed.

In particular, in addition to adjustment of the heating element temperature, the condenser temperature can be measured and cooling of the condenser depending on the measured condenser temperature can be controlled by a condenser cooling system regulator. Hence a precise adjustment of the introduced heat and the required cooling capacity is ensured.

According to a further aspect of the methods according to the disclosure, the condenser cooling system regulator ensures that the temperature of the condenser is always kept below the condensation temperature of the propellant and hence the vapor pressure of the propellant is always smaller than the operating pressure of the diffusion pump. Thus it is not necessary to reduce the condenser temperature to the lowest temperature possible by cooling the condenser. Rather, the method provides for individual adjustment of the condenser temperature which may in particular be changed as a function of the required operating pressure. Hence the required amount of cooling water is considerably reduced.

According to a further aspect of the methods according to the disclosure, during the pumping process the heating element temperature is adjusted to the upper value of the boiling range of the propellant used. A pumping process includes both pumping out the vacuum chamber and maintaining the operating pressure in the vacuum chamber. By adjusting the heating element temperature to the upper value of the boiling range as low a heat output as possible is attained, wherein at the same time a reliable evaporation of the propellant is ensured. The boiling range of the propellant used includes the range in which low-boiling portions of the propellant and high-boiling portions of the propellant evaporate. When the temperature is adjusted to the upper value of the boiling range of the changed propellant, both the low-boiling and the high-boiling portions of the propellant evaporate.

According to a further aspect of the methods according to the disclosure, the heating element temperature is adjusted to the required suction capacity of the pump during the pumping process. By increasing the heating element temperature in particular the suction capacity of the diffusion pump is increased. This is in particular required when the vacuum chamber is pumped out since in this pumping situation a large suction capacity is required for rapidly attaining the operating pressure in the vacuum chamber.

According to a further aspect of the methods according to the disclosure, the heating element temperature is reduced between pumping processes. If no pumping of the diffusion pump is required, the heating element temperature can be reduced in order to save energy. In particular, the heating element temperature is reduced between the pumping processes, at least by the value of the boiling range of the propellant used. If the heating element temperature is below the boiling range of the propellant used, no or only a small amount of propellant is evaporated such that no pumping effect is attained and at the same time considerable heating power can be saved. Of course, the heating element temperature can be further reduced between the pumping processes, wherein the propellant for the next pumping process must first be heated in an energy-intensive manner. Further, below a certain temperature gas accumulates in the propellant such that the propellant must first be degassed at the beginning of the next pumping process.

According to a further aspect of the methods according to the disclosure, the condenser temperature is adjusted during reduction of the heating element temperature. This is in particular effected between the pumping processes. However, when the operating pressure is maintained in the vacuum chamber the condenser temperature can be adjusted together with the heating element temperature such that an optimum diffusion process can be maintained during which the diffusion pump is operated in an energy-saving manner. Preferably, the condenser temperature is increased when the heating element temperature is reduced. However, this occurs only as long as the vapor pressure of the propellant at the increased condenser temperature is lower than the operating pressure of the diffusion pump.

According to a further aspect of the methods according to the disclosure, a diffusion pump configured as describe above is used in the method.

Further, the disclosure relates to the use of a heat pump with a diffusion pump. The heat pump is preferably modified as described above. In particular, the diffusion pump is also modified as described above.

BRIEF DESCRIPTION OF THE DRAWINGS

Hereunder the disclosure is explained in greater detail on the basis of preferred embodiments with reference to the appended drawings in which.

DETAILED DESCRIPTION OF THE PREFERRED EMBODIMENT

Figure 1:
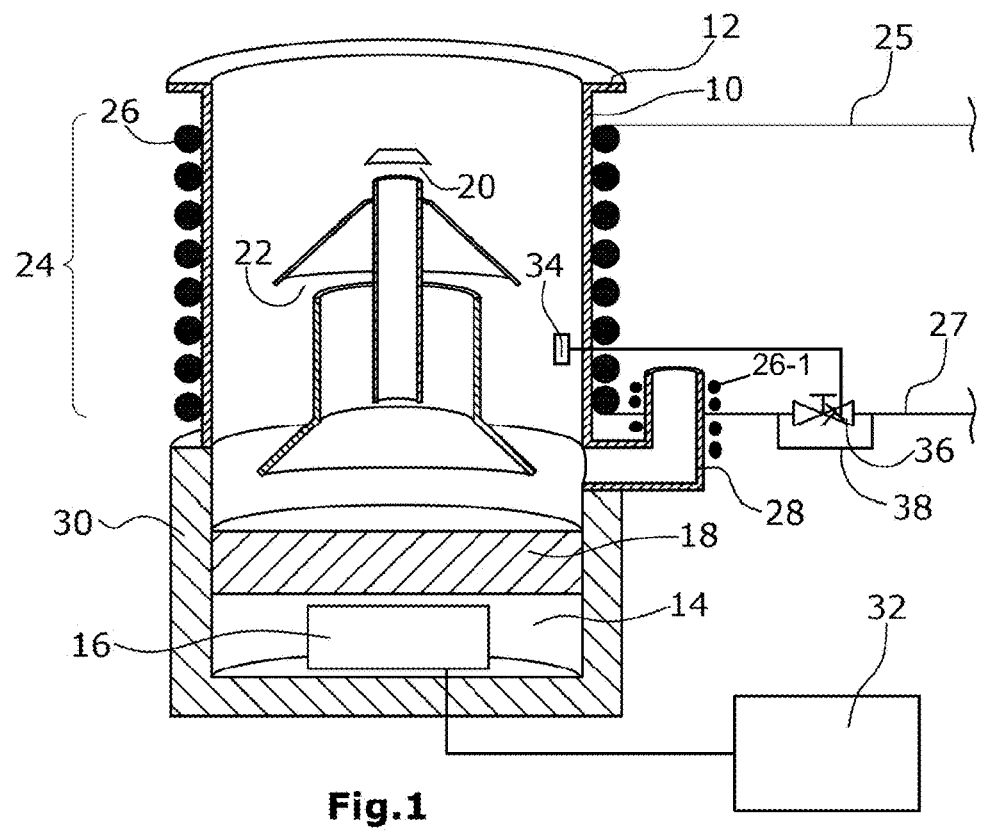
FIG. 1 shows a diagrammatic illustration of a first embodiment of the diffusion pump according to the disclosure.

The diffusion pump according to the disclosure comprises a housing 10 including at its high-vacuum-side end a flange 12 with the aid of which the housing 10 can be connected to a vacuum chamber not shown. The housing 10 is connected to a boiling chamber 14 which comprises a heating element 16. Via the heating element 16 a propellant 18 is evaporated, said propellant rising in the diffusion pump and escaping into the housing via the two nozzles 20, 22. Existing gas particles are entrained by the propellant vapor. The propellant vapor travels to a condenser 24 which is arranged in the area of the nozzles 20, 22 at the housing 10. The condenser 24 comprises a cooling system 26. In the illustrated embodiment, the cooling system 26 is a water cooling system having a supply line 27 and a discharge line 25.

The propellant vapor condenses at the condenser 24 and travels back to the boiling chamber 14.

Between the condenser 24 and the boiling chamber 14 a forevacuum branch 28 is arranged which is adapted to be connected to a forevacuum pump not shown. Gas transported by the propellant vapor is sucked off by the forevacuum pump via the forevacuum branch 28. The forevacuum branch 28 comprises a cooling system 26-1. Preferably, the cooling system 26-1 of the forevacuum branch 28 is independent of the cooling system 26 of the condenser 24.

To prevent loss of the heat of the heating element 16, the boiling chamber 14 is completely surrounded by an insulation 30. Hence heat is prevented from being dissipated from the boiling chamber 14 to the surroundings. Thus the required heat output of the heating element 16 is reduced.

The heating element 16 has connected thereto a heating element regulator 32 with the aid of which the heat output of the heating element can be adjusted to the respective pumping situation.

In the area of the condenser 24 a temperature measuring device 34 is arranged which measures the condenser temperature $T_c$. Here, the condenser temperature $T_c$ is measured at the condenser surface. The temperature $T_c$ of the condenser 24 can also be measured via the temperature of the cooling water of the discharge line 25. The temperature measuring device is connected to a condenser cooling system regulator which is configured as a thermostat valve 36. Via the thermostat valve 36 the cooling water flow V through the cooling system 26 of the condenser 24 can be adjusted depending on the measured surface temperature $T_c$ of the condenser 24.

To ensure that always minimum cooling of the condenser 24 is effected, the condenser cooling system regulator comprises an emergency means which is provided as a bypass 38 to the thermostat valve 36. When the condenser cooling system regulator fails, cooling water continues to be supplied through the bypass 38 to the cooling system 26 of the condenser 24 such that the propellant vapor continues to evaporate. The emergency means is in particular required in the case of power failure or sudden shutdown of the diffusion pump and ensures that due to minimum cooling of the condenser 24 the diffusion pump can be properly shut down without the propellant vapor entering the vacuum chamber.

Figure 2:
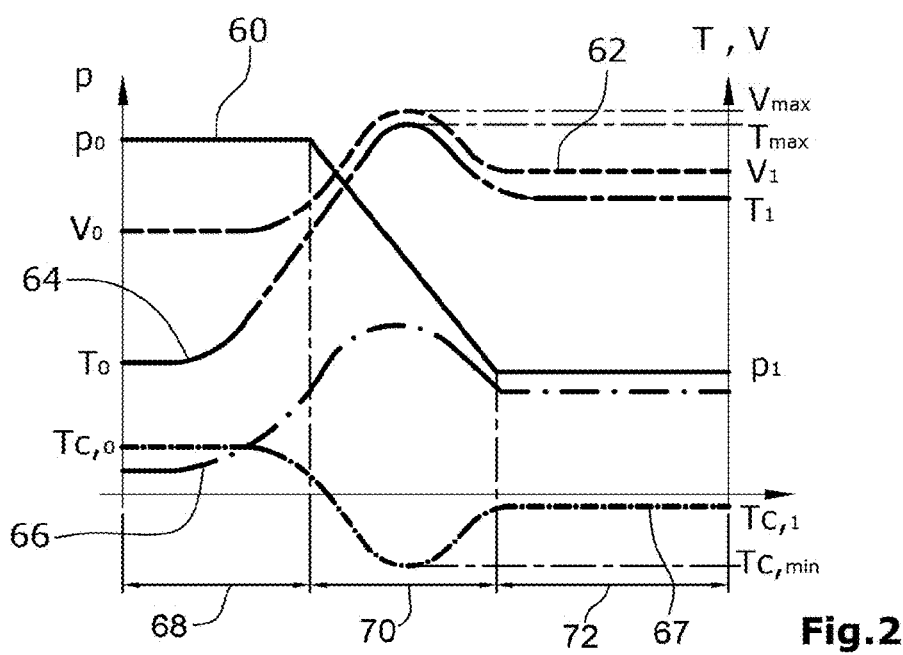
FIG. 2 shows a diagrammatic illustration of the pumping process on the basis of pump-specific variables.

The pumping process is explained in detail with reference to FIG. 2, wherein this is a diagrammatic illustration which does not show any exact values. In particular, the disclosure is not exclusively limited to the illustrated process flow of the pumping process since an exemplary pumping process is shown. In FIG. 2 the pressure p 60, the coolant flow V 62, the heating element temperature T 64, the vapor pressure of the propellant 66 as well as the condenser temperature $T_c$ 67 are illustrated for the different pumping situations. The left vertical axis of the graph describes the pressure for the line 60 and the line 66, whereas the right vertical axis depicts the temperature for the lines 64 and 67 as well as the coolant flow for the line 62. On the horizontal axis of the graph of FIG. 2 the different pumping situations are plotted.

In the area 68 there is only a small pumping effect or no pumping effect at all. In the vacuum chamber a pressure $p_0$ prevails. This situation is encountered between two pumping processes and in particular during standby operation.

In the second area 70 a pressure reduction from an initial pressure $p_0$ to an operating pressure $p_1$ is effected by a pumping-out process. When the vacuum chamber is pumped out 70 the heat output and correspondingly the temperature T of the heating element 16 are increased to the maximum value $T_{max}$ to increase the suction capacity of the diffusion pump. For compensating the increased heat input by the heating element 16 the amount of cooling water V for cooling the condenser 24 is increased. Here, it is not necessary that the condenser temperature $T_c$ in the area 70 reaches a minimum $T_{c,min}$. The coolant flow V through the condenser 24 may be controlled such that the condenser temperature $T_c$ continuously decreases from its initial value $T_{c,0}$ to the operating value $T_{c,1}$.

When the operating pressure $p_1$ has been reached in the vacuum chamber, the heating element regulator adjusts the temperature T of the heating element 16 to the upper value of the boiling range of the propellant used. Here, the temperature T of the heating element 16 is reduced from its maximum value $T_{max}$, which is required for rapidly reaching the operating pressure $p_1$ in the area 70, to the value $T_1$. Hence a pumping effect continues to be ensured since in particular $T_1$ is larger than $T_0$ such that an unnecessary heat input is prevented. The reduction of the heat output of the heating element 16 from $T_{max}$ to $T_1$ at the same time results in the amount of cooling water V being reduced by the condenser cooling system regulator in the form of the thermostat valve 36 from $V_{max}$ to $V_1$. Hence the surface temperature of the condenser 24 increases to $T_{c,1}$ and/or the condenser end temperature $T_{c,1}$ is reached. An increase of the surface temperature $T_c$ of the condenser is, however, intended only when, at the increased temperature, the vapor pressure 66 of the propellant continues to be below the operating pressure $p_1$ of the vacuum chamber, as shown in FIG. 2

Between two pumping processes 68 the temperature T of the heating element 16 is reduced to below the lower value of the boiling range of the propellant used. Hence no or only a very small amount of propellant 18 is evaporated. A pumping effect is neither required nor attained at a reduced heat output of the heating element 16. Simultaneously with the reduction of the temperature T of the heating element 16 to $T_0$ between two pumping processes the coolant flow V of the cooling system 26 of the condenser 24 is reduced to $V_0$ by the thermostat valve 36.

Figure 3:
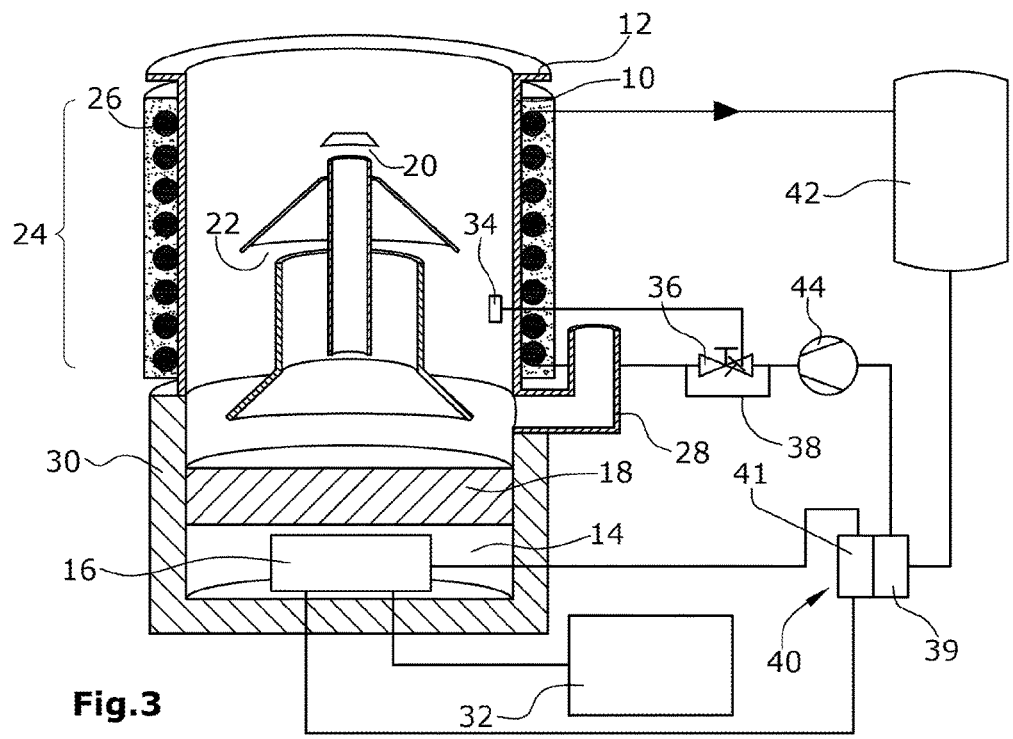
FIG. 3 shows a diagrammatic illustration of a second embodiment of the diffusion pump according to the disclosure.

FIG. 3 shows a second embodiment of the disclosure. Identical parts are designated by identical reference numerals. Although this is an alternative embodiment, for the purpose of saving energy required for a diffusion pump it is nevertheless possible to combine the individual features of the first embodiment with those of the second embodiment, unless such features are mutually exclusive.

According to the second embodiment, the cooling system 26 is connected to a heat pump 40 which comprises a condenser 41 and an evaporator 39. Cooling water travels from the cooling system 26 at the housing 10 of the diffusion pump to a reservoir 42. From the reservoir 42 the still warm cooling water travels to the heat pump 40 which extracts heat from the cooling water. Hence the temperature of the cooling water is reduced. The cooling water cooled in this manner is fed to the cooling system 26 via a feed pump 44 through the thermostat valve 36 or the bypass 38. The heat energy extracted from the cooling water by the heat pump is fed to the heating element 16 via a heating circuit. Thus heat extracted by the cooling system 26 is used to heat the propellant 18 via the heating element 16. The heat extracted by the cooling system 26 has no dissipation loss, and at the same time the required energy which has to be fed to the heating element 16 from outside, for instance in the form of electric energy, can be reduced. Here, the heat pump 40 is in particular configured as a compression heat pump. In particular, it may be preferable to reverse the flow direction such that the cooling water first dissipates its heat energy in the heat pump 40 and then travels to the reservoir 42. From there, the cooling water is fed to the cooling system 26 with the aid of the feed pump 44.

Figure 4:
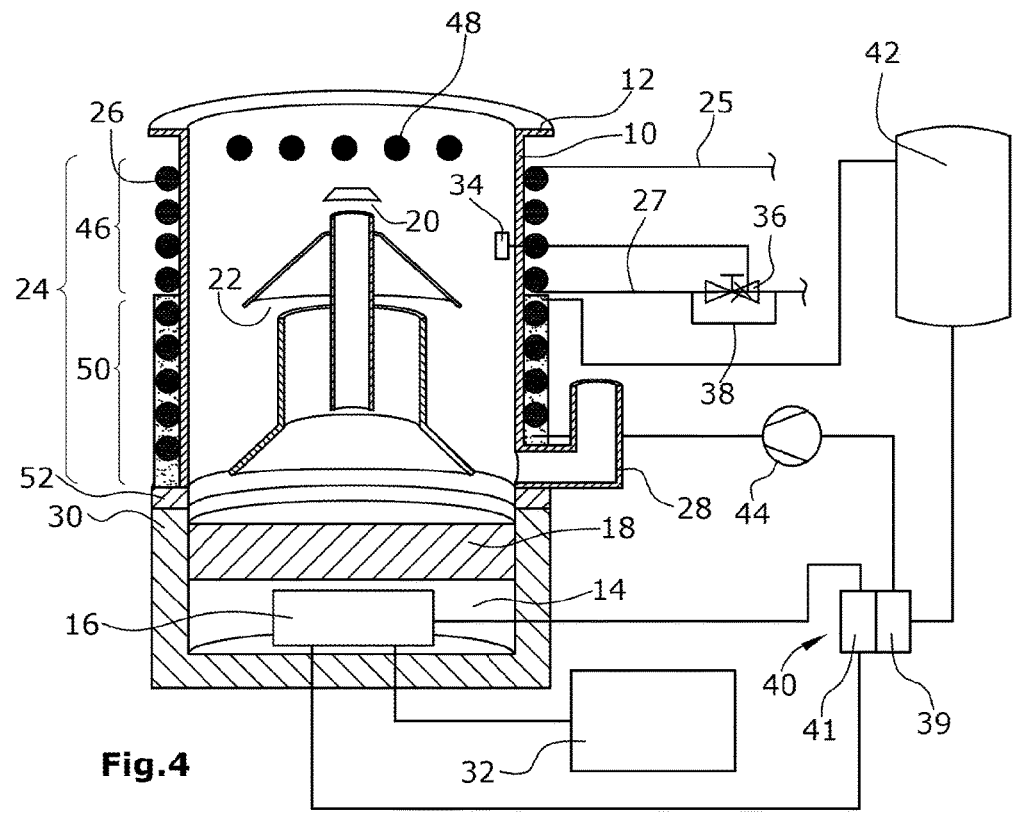
FIG. 4 shows a diagrammatic illustration of a third embodiment of the diffusion pump according to the disclosure.

In FIG. 4 a third embodiment is illustrated, wherein identical parts are designated by identical reference numerals. Features of the preceding embodiments can be combined with those of the third embodiment for reducing the energy demand of the diffusion pump as long as the features are not mutually exclusive.

According to the third embodiment, the high-vacuum-side area 46 is configured as a water cooling system 26. Further, a vapor barrier 48 is provided which comprises a water cooling system. The area 50 of the condenser 24 adjacent in the direction of the heating element 16 is connected to a heat pump 40 such that heat from the area 50 is fed to the heating element 16 via the heat pump 40 thus heating the propellant 18. In addition, a controllable thermostat valve may be arranged in the circuit of the heat exchanger, which thermostat valve is in particular adapted to be controlled by means of the temperature measuring device 34 or an additional temperature measuring device arranged in the area 50.

In particular, the boiling chamber 14 is thermally isolated from the housing 10 by an isolator 52. The isolator 52 causes the heat generated by the heating element 16 not to travel to the housing 10 and thus the heat need not be dissipated via the cooling system 26 or the heat pump 40. Thus the energy consumption of the diffusion pump is further reduced. The isolator 52 has a low heat conductivity.

What is claimed is:

1. A diffusion pump, comprising
    a housing,
    a boiling chamber connected to said housing,
    a heating element arranged in said boiling chamber,
    a nozzle arranged in said housing and connected to said boiling chamber,
    a condenser arranged in said housing in an area of said nozzle, and
    a cooling system configured for cooling said condenser and arranged in an area of said condenser,
    wherein
    said cooling system of said condenser is connected to said heating element via a heat pump such that heat from said condenser is supplied to said heating element.

2. The diffusion pump according to claim 1, further comprising an isolator that thermally isolates said boiling chamber from said condenser, wherein the isolator comprises PEEK, PTFE, another plastic material or a ceramic material.

3. The diffusion pump according to claim 1, wherein the boiling chamber is thermally insulated.

4. The diffusion pump according to claim 1, further comprising a vapor barrier axially spaced apart from the nozzle, wherein said vapor barrier comprises a vapor barrier cooling system independent of the cooling system of the condenser.

5. The diffusion pump according to claim 1, further comprising a forevacuum branch arranged between the nozzle and the boiling chamber, wherein said forevacuum branch comprises a cooling system.

6. The diffusion pump according to claim 5, wherein the cooling system of the forevacuum branch is independent of the cooling system of the condenser.

7. The diffusion pump according to claim 5, wherein the cooling system of the forevacuum branch is at least partially a water cooling system.

8. The diffusion pump according to claim 1, further comprising a regulator that regulates said cooling system of said condenser, wherein the regulator comprises a thermostat valve.

9. The diffusion pump according to claim 8, wherein the regulator further comprises a bypass of the thermostat valve that ensures minimum cooling of the condenser.

10. The diffusion pump according to claim 1, wherein the heat pump comprises an evaporator and a second condenser, the evaporator is connected to the cooling system of the condenser and the second condenser is connected to the heating element.

11. The diffusion pump according to claim 1, wherein the heat pump is configured as a compression heat pump or an absorption heat pump.

12. The diffusion pump according to claim 1, wherein the cooling system of the condenser is realized both by a water cooling system and the heat pump.

13. The diffusion pump according to claim 1, wherein the condenser comprises a high-vacuum-side area having a water cooling system and the area of said condenser adjacent, in a direction of the heating element, is connected to the heat pump.

14. The diffusion pump according to claim 1, wherein the heat pump is of a multistage configuration.

15. A method for controlling a diffusion pump, comprising:
    a housing,
    a boiling chamber connected to said housing,
    a heating element arranged in said boiling chamber,
    a nozzle arranged in said housing and connected to said boiling chamber,
    a condenser arranged in said housing in an area of said nozzle, and
    a cooling system configured for cooling said condenser and arranged in an area of said condenser,
    wherein the condenser temperature is measured and said cooling system of said condenser is controlled by a regulator depending on the condenser temperature, and
    wherein
    said cooling system of said condenser is connected to said heating element via a heat pump such that heat from said condenser is supplied to said heating element.

* * * * *